Figure 1:
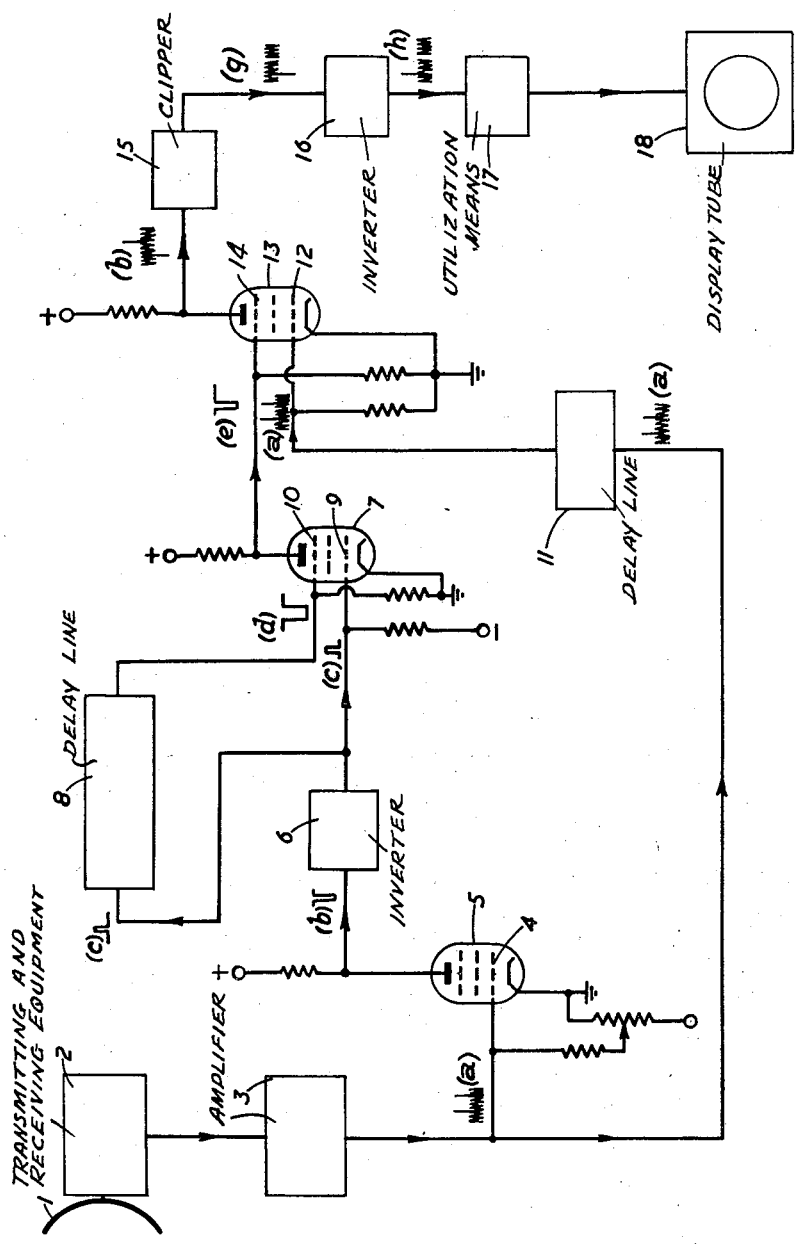

March 6, 1962   A. W. DALE   3,024,457
RADAR SYSTEMS
Filed March 24, 1958   2 Sheets-Sheet 1

INVENTOR:
Alan Wheatley Dale
BY:
Baldwin & Wight
ATTORNEYS.

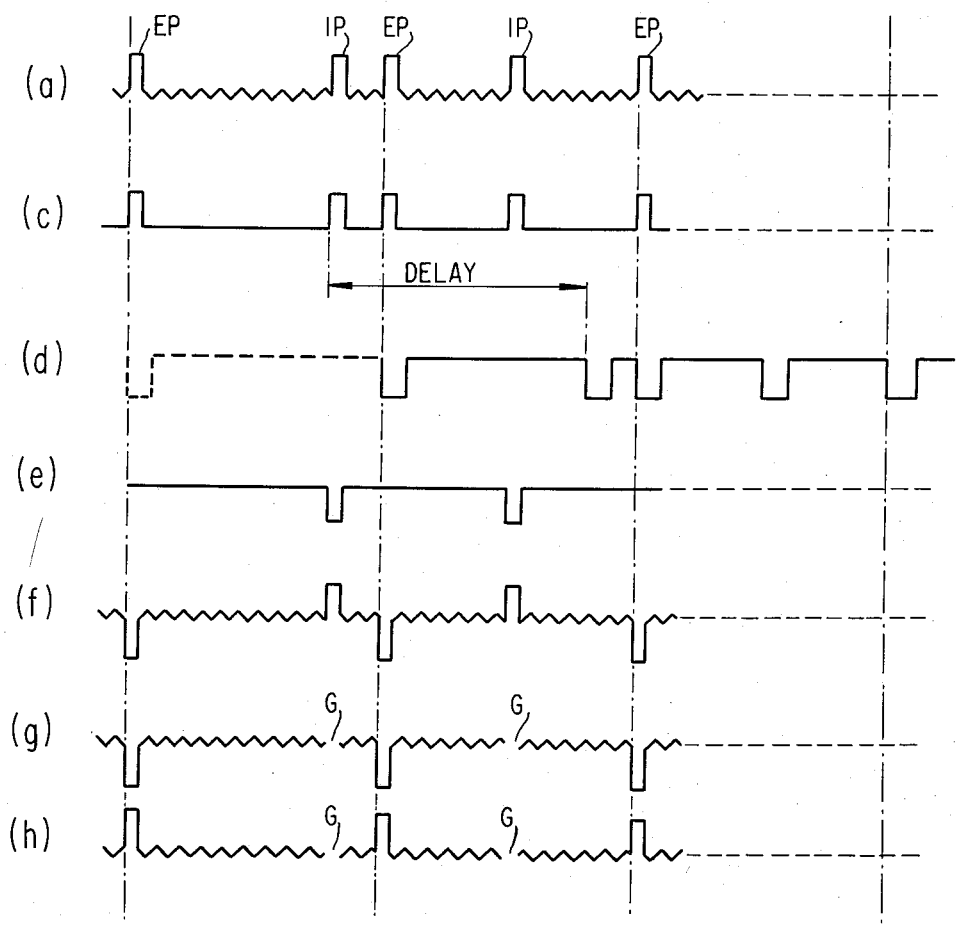

United States Patent Office 3,024,457
Patented Mar. 6, 1962

3,024,457
RADAR SYSTEMS
Alan Wheatley Dale, Rochester, N.Y., assignor to Marconi's Wireless Telegraph Company Limited, London, England, a British company
Filed Mar. 24, 1958, Ser. No. 723,474
Claims priority, application Great Britain Apr. 9, 1957
5 Claims. (Cl. 343—17.1)

This invention relates to radar systems and has for its object to provide improved radar systems in which a certain common form of interference is eliminated or substantially reduced.

As is well known, radar stations may be seriously interfered with, either deliberately or accidentally, by pulse signals which are received by the receiving equipment of the station, but which are not the desired echo pulses resulting from reflection at a target of pulses transmitted by the station. Such interfering pulses may come from other independently operated radar stations or they may be the result of deliberate jamming. In general, such interfering pulses will not occur at the pulse repetition frequency employed by the station, and the present invention seeks to eliminate or reduce the adverse effects of such interfering pulses if they are greater in amplitude than the general radar noise level of the station. Interfering pulses which are below the general radar noise level are obviously not troublesome. As will be seen later, one of the advantages of the present invention is that it provides a system of pulse cancellation which is independent of the signal-noise setting of the normally provided receiving channel of the station, and another advantage is that the pulse cancellation equipment has only to deal with a narrow band of frequencies (as compared with the bandwidth of the normally provided video signal channel of the receiver) so that it need not be either expensive or complex. A further advantage of the invention is that the reduction or elimination of interfering pulses is effected with a minimum of loss of desired signal information.

According to this invention a pulses radar station comprises means for separating all received signal pulses exceeding a predetermined amplitude, means for delaying the separated pulses for a time delay equal to the pulse repetition period of the station, a double input control circuit connected to receive the delayed separated pulses as one input and undelayed separated pulses as the other and adapted to provide output in response to the application of a signal to one input only (but not in response to the co-incident application of a signal to both inputs), and means for utilising the output from said control circuit substantially to eliminate interfering pulses from the received signals displayed.

Preferably the double input control circuit comprises a multi-grid valve having two input grids, one connected to receive delayed separated pulses and the other connected to receive undelayed separated pulses, said valve being so biassed and operated that it will produce a pulse at its anode only in response to a pulse on one input grid unaccompanied by a simultaneous pulse on its other grid.

Preferably also the means for utilising the output from the double input control circuit substantially to eliminate interfering pulses from the received signals displayed comprise a normally open gate circuit included in the normally provided received video signal channel of the receiver and adapted to be closed by output signals from said control circuit. This gate circuit may be constituted by a multi-grid valve having one grid connected to receive the video signals and the other connected to receive the output signals from the said control circuit. Theoretically, it is possible to combine the output signals from the control circuit with received video signals in mutually cancelling opposition instead of employing the said output signals to gate the video signals but this is, in practice, considerably more difficult to achieve satisfactorily and is therefore, not preferred.

The delay may be provided in any known convenient way, but one simple and preferred way is to use a magneto-strictive delay line as known per se. However, other forms of delay device may be used, among them being storage electron discharge tubes, mercury delay lines, and mechanically driven delay devices such as rotating magnetic drums or tapes with relatively displaced signal storing and signal pick-up device, all as known per se.

The invention is illustrated in the accompanying drawing in which FIGURE 1 is a combined schematic block diagram of a preferred embodiment thereof and FIGURE 2 comprises FIGURES 2a and 2c through 2h showing time plots of waves occurring at various points in the circuit of FIGURE 1 as designated by the corresponding letters.

Referring to FIGURE 1 of the drawing the radar station which is shown only to the extent and detail necessary for an understanding of the present invention, comprises the usual transmit-receive aerial 1 connected to radar transmitting and receiving equipment of any known suitable form and represented merely by block 2. Received video signals from the equipment at 2 are amplified by an amplifier 3 and fed to the control grid 4 of a valve 5 which is so biassed and operated as to act as a threshold amplifier. In other words, the valve 5 is so biassed and operated as to pass only signals which exceed a predetermined amplitude—which may be adjustable. This threshold amplitude is selected to be at about the general noise level. Video signals comprising general noise with pulses of amplitude greater than the general noise level are represented conventionally in FIGURE 2a. The echo pulses are designated EP while the interference pulses are designated IP in FIGURE 2a. These unwanted interference pulses are the pulses which are to be removed from the final display. The valve 5 is adjusted to pass these pulses (represented as positive going) but its threshold value is so chosen that the noise is not passed.

Output from the valve 5 is fed to a phase inverting stage 6, e.g. a single stage amplifier. The positive going pulses will appear at the anode of the valve 5 as negative going pulses which are converted by the inverter 6 into positive going pulses as represented at 2c and which pulses are fed along two paths, one to the control grid 9 of a multi-grid valve 7 shown as a pentode, and the other to the input of a delay line 8 which may be of any kind known per se, for example a magneto-strictive delay line. This delay line gives a delay equal to the pulse repetition period of the station. To assist in ensuring this equality, the delay line may, in practice, be used as part of the equipment controlling the pulse repetition period, though this is not necessary and is not shown in the drawing. The delay line is such as to provide, in response to each input positive pulse, an output negative pulse of suitable amplitude and duration, for example a duration of 8 $\mu$sec. The output pulses which are represented at FIGURE 2d are applied to the suppressor grid 10 of the pentode 7 which is of the short suppressor grid base type and has its control grid biased just below cut-off so that when the suppressor grid is at earth potential the valve will conduct only upon the application of a positive pulse at the control grid. Accordingly, the valve 7 will produce an anode pulse only in response to a positive pulse appearing at the control grid at a time when a negative pulse is not applied to the suppressor grid. Due to the fact that the delay of the line 8 is equal to the pulse repetition period of the station, a positive pulse applied to the control grid 9 and resulting from the reception of an echo signal from a target at a given range, will not cause an anode pulse to appear from the valve because it will coincide in time with the application of a negative pulse from the delay line 8 to the suppressor grid 10. Thus (neglecting the first received echo pulse) the only pulses appearing at the anode of the valve 7 will be due to interfering pulses which are non-synchronous with the pulse repetition of the station. Thus the output from the valve 7 is, in effect, an interference pulse output. This interference pulse output is used to gate the normally provided video signal channel of the receiver portion of the station. As shown, video signals from the amplifier 3 are fed through a delay line 11 giving only a very small delay (for example ¼ to ½ μsec.) to the control grid 12 of a further pentode 13 whose suppressor grid 14 is connected to receive the negative going pulses from the anode of the valve 7. One series of such negative going pulses are represented at FIGURE 2e. The purpose of the additional delay line 11 is merely to delay the application of the video signals to the control grid 12 sufficiently to ensure that the control pulses on the suppressor grid 14 shall have time to become fully effective to produce the required gating action. The valve 13 is also a short suppressor grid base pentode and is so biassed that in the absence of a pulse on the suppressor grid 14 the signals applied to the grid 12 will pass through the valve, both grids 12 and 14 of the valve 13 being arranged to operate under class A bias conditions. When, however, a negative going pulse appears on the suppressor grid 14 the valve 13 is cut off and accordingly, for the duration of such a pulse, i.e. during the presence of an interference signal, the video signal channel is effectively blocked.

The output from the valve 13 is represented conventionally at FIGURE 2f and is fed to a diode or other clipping circuit 15 as known per se and which serves to eliminate signals in the positive direction from the anode of the valve 13. The resulting clipped signals represented at FIGURE 2g will be video signals free from positive pulses and "gapped" at G where interference pulses, IP shown in FIGURE 2a, previously existed. These signals are fed to an inverting stage 16, the output from which is represented in FIGURE 2h and then fed to any known suitable utilisation circuits at 17 driving in the usual way a cathode ray display tube represented at 18.

In practice, with the illustrated arrangement using a delay line 8 constituted by a magneto-strictive line, aircraft responses or interference pulses closer together in time than about 9 μsecs. (corresponding to a range of ¾ of a nautical mile) will not produce separate delayed gate pulses, since each pulse is, in practice, followed by a damped oscillation which prevents pulses which are too close together from producing separate gate pulses. If this limitation is regarded as objectionable it may be overcome or reduced by using delay lines giving shorter output pulses. In practice, however, the additional expense involved in the use of such delay lines will usually not be regarded as justified since the results obtained by the simple apparatus shown are, in most cases, adequate and satisfactory.

I claim:

1. A pulsed radar station comprising means for transmitting and receiving signals, means for displaying received signals, means for separating all received signal pulses exceeding a predetermined amplitude, means connected to said separating means for delaying the separated pulses for a time delay equal to the pulse repetition period of the station, a double input control circuit connected to receive the separated pulses delayed for said pulse repetition period as one input and undelayed separated pulses as the other input for providing an output signal only in the absence of a signal at said one input and in response to the application of a pulse to said other input, and means controlled by the output signal from said control circuit for suppressing the display of signals by said display means.

2. A pulsed radar station comprising means for transmitting and receiving signals, means for displaying received signals, means for separating all received signal pulses exceeding a predetermined amplitude, means for delaying the separated pulses for a time delay equal to the pulse repetition period of the station, a double input control circuit fed with separated pulses delayed for said pulse repetition period as one input and with undelayed separated pulses as another input for providing an output signal in response to the application of a signal to said another input only in the absence of the coincident application of signals to both inputs, and means, fed with said output for substantially eliminating interfering pulses from the received signals displayed.

3. A station as claimed in claim 2 wherein the double input control circuit comprises a multi-grid valve having two input grids, one connected to receive delayed separated pulses and the other connected to receive undelayed separated pulses, said valve being so biassed and operated that it will produce an output pulse at its anode only in response to a pulse on one input grid unaccompanied by a simultaneous pulse on its other grid.

4. A station as claimed in claim 2 having display means fed from said receiving means via a video signal channel wherein said means for substantially eliminating interfering pulses from the received signals displayed comprises a normally open gate circuit included in the received video signal channel, and means, responsive to said output, for closing said gate circuit.

5. A station as claimed in claim 4 wherein the gate circuit is constituted by a multi-grid valve having two input grids, one connected to receive the video signals and the other connected to receive the said output signals.

References Cited in the file of this patent

UNITED STATES PATENTS 2,446,244    Richmond _____ Aug. 3, 1948